United States Patent [19]
Wells

[11] Patent Number: 5,639,532
[45] Date of Patent: Jun. 17, 1997

[54] MULTILAYER CLEANSING KIT AND TOWEL SYSTEM

[76] Inventor: Donald R. Wells, 9452 Brynmar Dr., Villa Park, Calif. 92667

[21] Appl. No.: 374,905

[22] Filed: Jan. 19, 1995

[51] Int. Cl.⁶ .................. B32B 3/02; A47K 7/02; B65D 81/24; B65D 64/00

[52] U.S. Cl. .................. 428/95; 428/100; 428/101; 428/305.5; 15/208; 15/209.1; 15/227; 206/205; 206/581

[58] Field of Search .................. 15/208, 209.1, 15/227; 428/305.5, 95, 100, 101; 206/205, 581

[56] References Cited

U.S. PATENT DOCUMENTS

| | | | |
|---|---|---|---|
| 2,779,465 | 1/1957 | Anderson | 206/47 |
| 3,414,927 | 12/1968 | Worcester | 15/104.93 |
| 3,608,708 | 9/1971 | Storandt | 15/227 |
| 3,674,613 | 7/1972 | Lavigne | 161/37 |
| 4,555,811 | 12/1985 | Shimalla | 428/286 |
| 5,055,216 | 10/1991 | Johnson | 252/91 |
| 5,079,792 | 1/1992 | D'Haen | 15/227 |
| 5,085,653 | 2/1992 | Levy | 604/358 |
| 5,111,934 | 5/1992 | Morin | 206/229 |
| 5,114,418 | 5/1992 | Levy | 604/365 |
| 5,301,806 | 4/1994 | Olson | 15/227 |

*Primary Examiner*—Terrel Morris
*Attorney, Agent, or Firm*—G. Donald Weber, Jr.

[57] ABSTRACT

A cleansing kit composed of a plurality of layers of absorbent layers or tissues laminated together with an inner one of said absorbent layers being impregnated with a cleaning or other solution and an outer one of said absorbent layers being kept dry by an impermeable plastic middle layer, said inner layer serving to clean a surface being cleaned and/or sterilized and said dry outer layer serving to remove any excess cleaner and loosened residual material from said surface after cleaning has been completed.

11 Claims, 1 Drawing Sheet

MULTILAYER CLEANSING KIT AND TOWEL SYSTEM

BACKGROUND

1. Field of the Invention

The present invention relates, generally, to cleansing kits comprised of tissues or towels and, more particularly, to a cleansing kit composed of a plurality of layers of towels or tissues laminated together with at least one towel impregnated with a cleansing solution enclosed within a dry towel with an impervious layer disposed intermediate the wet and dry towels.

2. Description of the Prior Art

Cleansing tissues with a liquid impregnated therein have been provided in the prior art. The prior art tissues have been primarily for the purpose of moistening or cleaning the skin, particularly after eating a meal or after the skin has been subjected to environmental conditions which tend either to dry or contaminate it. One widely distributed product for this purpose comprises wet tissues distributed under the trade name "Baby Wipes" for cleansing an infant after a "dirty" diaper has been removed. However, after the skin has been treated with such a tissue it is often necessary to utilize another dry towel or tissue to remove excess moisture and/or any material loosened but not picked up in the initial cleansing.

Another occasion where premoistened cleansing cloths are used is in the removal of grease, dirt, finger prints and other contamination from windows, kitchen surfaces and for cleaning industrial and automotive parts and equipment or the like. However, in almost every case, one or more additional towels or cleaning cloths are needed to dry the surface.

SUMMARY OF THE INVENTION

The present invention comprises an inner tissue or towel, an outer tissue or towel and an impermeable flexible separator liner positioned between the inner and outer towels. The two towels and the separator liner are laminated together to form a single unit. In use, the inner towel is impregnated with one or more cleansing, emollient or other liquid agents. After such impregnation, the laminated assembly is folded over itself to form a flattened, portable packet. This packet is then sealed along the three adjacent sides or edges. Thus, the inner towel is completely encased within the impermeable separator and will not dry out on prolonged standing. Further, the separator serves to keep the outer towel dry by preventing it from contacting the inner towel and absorbing any of the fluid therefrom.

To use the towel system, the sealed edges are separated and the packet is unfolded. The wet towel is placed on the surface to be cleaned. The dry towel is utilized as a gripping surface. A pocket can be formed on the dry towel to serve as a hand retainer, if desired. After the cleaning operation is completed, the system is turned over and the dry towel can be used to dry the surface. The system can be refolded so that the moist layer is inside and the dry layer is exposed, if desired.

After use, the combined towel system can be discarded according to the environmental regulations in effect at the time. Alternatively, when fabricated of suitable materials, the towel system can be salvaged after use by laundering it in a suitable washing machine, reimpregnating the inner towel and then reusing it as described above.

Because the liquid cleansing agent is effectively sealed inside the folded towel system, a plurality of these flattened sealed towel systems can be easily boxed and sold commercially.

PRIOR ART STATEMENT

Listed herewith are patents which were discovered during a preliminary search.

U.S. Pat. No. 5,147,703; GOLF TOWEL SET; Provost et al. This patent is directed to a golf towel set which has a main towel and a detachable accessory towel.

U.S. Pat. No. 5,111,934; PORTABLE CLEANING KIT; Morin. This patent is directed to a cleansing kit in the form of a packet having two separate, stacked, air-tight compartments which include quadrangular walls sealed around the periphery thereof.

U.S. Pat. No. 5,055,216; MULTILAYER CLEANSING TISSUE CONTAINING A PERFUME AND/OR AN EMOLLIENT SUITABLE FOR HUMAN SKIN; Johnson. This patent is directed to a tissue of a plurality of fibrous layers laminated together with one or more layers being processed differently.

U.S. Pat. No. 4,510,640; DUSTER-POLISHER MADE OF PLASTIC FILM; Omori. This patent is directed to a polisher having at least one pocket of plastic film with layers having different properties.

U.S. Pat. No. 3,684,603; METHOD OF MAKING A TWO-SIDED TOWEL; Iltis. This patent is directed to two-ply paper toweling with rough and smooth surfaces joined together by adhesive and mechanical embossing.

U.S. Pat. No. 3,674,613; COMPOSITE MOISTURE-TIGHT STRUCTURE OF ABSORBENT TISSUE BONDED TO AN IMPERMEABLE THERMOPLASTIC MATERIAL; LaVigne. This patent is directed to a moisture-tight handkerchief with a first layer of soft absorbent tissue and a second layer of air impermeable flexible material bonded thereto and folded to form a moisture-containing packet.

U.S. Pat. No. 3,414,927; COMPOSITE WEB FOR TREATING HUMAN TISSUE; Worcester. This patent is directed to a disposable towel with two impregnated, absorbent paper sheets separated by a moisture barrier which can be sealed in a moisture-proof envelope.

U.S. Pat. No. 2,779,465, COMPOSITE DISPOSABLE PAD; Anderson. This patent is directed to a composite pad comprising an applicator pad and a drying pad separated by an impervious layer with fluid impervious envelopes for storing same.

BRIEF DESCRIPTION OF THE DRAWINGS

For the purpose of illustration, a preferred embodiment of the present invention is shown in the drawings. It is understood, however, that the invention is not limited to the precise arrangements and instrumentalities shown.

DESCRIPTION OF A PREFERRED EMBODIMENT

The following detailed description is directed to the presently contemplated mode of carrying out the invention. This description is not intended to be limitative, but is made solely for the purpose of illustrating the general principles of the invention.

The various features and advantages of the present invention may be more readily understood with reference to the following detailed description, taken in conjunction with the accompanying drawings, wherein like numbers refer to the same feature or part thereof.

Figure 1:
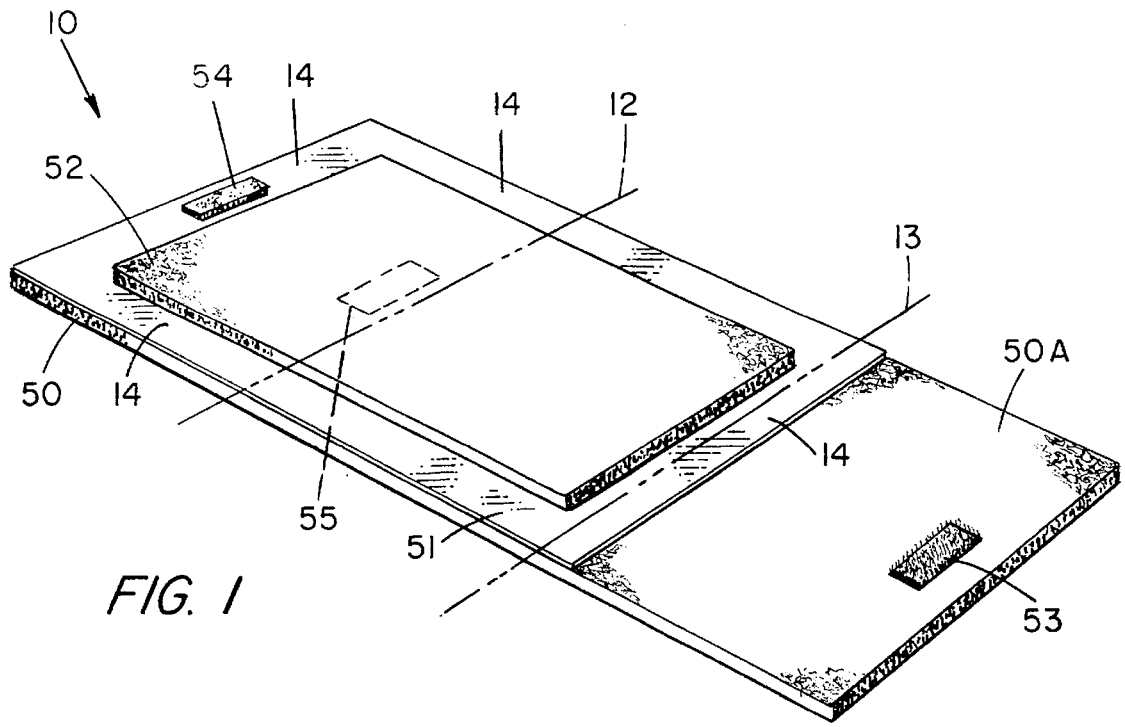
FIG. 1 is a perspective, plan view of the basic embodiment of the present invention.

Referring now to FIG. 1, there is shown a perspective, plan view of a preferred embodiment of a laminated cleansing towel system 10 according to the present invention. As shown therein, cleansing system 10 is, generally, rectilinear in shape. Of course, other shapes are also contemplated. The system 10 includes an outer towel 50, an inner towel 52 and an impermeable layer 51. The towels 50 and 52 can be of any suitable material such as, but not limited to, terry cloth. The impermeable layer 51 can be of any suitable material such as, but not limited to, a thin layer of polyethylene, rubber or the like. The three layers 50, 51 and 52 are joined together by stitching, adhesives, sonic welding or the like. This joinder should be quite secure, but should not produce any abrasive areas at the surfaces of either of the towels.

As shown, the towel 50 and layer 51 are of about the same width. In the embodiment shown, towel 50 is approximately twice as long as the layer 51. However, it is contemplated that the extended portion 50A of towel 50 can be omitted in some embodiments, if so desired.

In addition, the towel 52 is smaller than layer 51, in both width and length. Thus, a border 14 is formed around the layer 51. This border is used to seal the towel 52 within the impermeable layer 51 after the system 10 is folded over at the fold line indicated by dashed line 12.

As shown in FIG. 1, the extended portion 50A of layer 50 includes a suitable fastener 53. This fastener can be, for example, one component of a typical hook and loop fastener, frequently sold under the trademark VELCRO.

A mating fastener component 54 can be placed near the far edge of layer 51. Thus, the fastener components 53 and 54 can be selectively joined together whereby extended portion 50A effectively covers the surface of towel 52. This arrangement can provide an uncontaminated surface over towel 52, if desired, during a drying operation as described infra.

In addition, another fastener component (shown in phantom outline) can be placed on the undersurface of towel 50 to interconnect with fastener component 53. This arrangement can be used to secure flap 50A to the system in the folded condition described hereinafter. Of course, the flap 50A can be omitted, if so desired.

Figure 2:
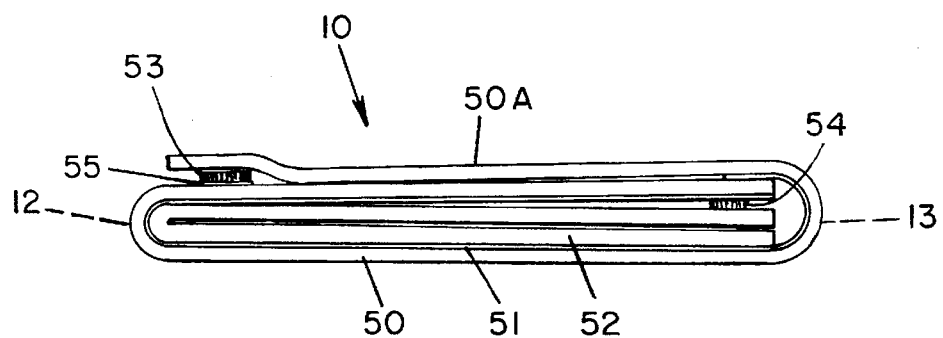
FIG. 2 is a cross sectional view of the present invention in the folded condition.

Referring now to FIG. 2, there is shown a cross sectional view of the internal arrangement of cleansing towel system 10. As shown in FIG. 2, cleansing system 10 comprises the inner towel 52 and outer wiping towel 50 separated from one another by thin, impermeable, flexible separator 51. For home or industrial use, inner towel 52 is first soaked or impregnated with a cleaning solution such as soapy water, abrasive suspensions, ammonia solution, acetic acid solution (vinegar), anti-freeze solution or one or more petroleum based solvents and combinations thereof. After such soaking, the assembly is then folded over at fold 12 more or less in half to form a flattened, flexible towel packet. As noted above, the outer towel 50 and the separator liner 51 are larger than inner towel 52, so that when folded over, the borders 14 extend beyond the edges on three sides of towel 52. These borders 14 can then be crimped, heat sealed or otherwise joined together to prevent loss of the impregnating solution by evaporation or leakage.

In the embodiment shown, the flap 50A is folded over at fold 13 and wrapped around the sealed edge 14 of the towel 50 and layer 51. The fastener 53 is joined to another fastener 54 on the outer surface of towel 50. This arrangement keeps the flap 50A secured, if desired.

It should be understood that the fasteners 53, 54 and/or 55 should, preferably, be recessed and/or formed of a non-abrasive material in order to prevent scratching of the surface to be cleaned. Alternative types of fastening may be utilized. (Of course, the flap 50A can be omitted entirely, if desired.) Placing the entire folded, sealed unit in a plastic or aluminum foil bag (not shown) will keep it clean until the cleansing towel system 10 is placed in service.

Placing the cleaning system into service merely involves removing it from its container (or unfastening flap 50A) and then opening the sealed borders 14. After unfolding, the moist, impregnated inner towel 52 is ready for use on the surface to be cleaned. After such cleaning, the towel system 10 is reversed thereby to engage the cleaned surface with outer wiping towel 50 for drying or polishing the surface just cleaned.

The material used for towels 50 and 52 can be any strong absorbent material such as terry cloth, muslin or any other inexpensive absorbent paper, cotton, wool or plastic material. The surfaces of towels 50 and 52 can be rough, as with terry cloth, or smooth, as with many of the conventional paper towelettes. It is not necessary for inner towel 52 and outer towel 50 to be made of the same or even similar materials. Thus, terry cloth outer towels could readily be combined with an inner towel 52 comprising one or more thin sheets of plastic sponge impregnated with one or more moist solvents to produce a composite system uniquely suited for cleaning highly contaminated surfaces.

Although not obligatory, it would be highly desirable to use biodegradable materials. Such items could then be either discarded in a landfill or merely thrown into the water of a toilet bowl for disposal without concern to damages to the environment.

There are no size limitations to the system 10. However, particularly for larger size units, one or both of the inner and outer towels may be modified to include small hand pockets (not shown) so that the towel may be more easily held and manipulated in use. Also, when the use involves only light cleaning, and most of the impregnant still remains, the cleansing towel 10 can be refolded and used again at a later date.

Depending upon the impregnant added to the inner towel, the present invention has a wide variety of uses. These uses include wiping automobile windshields by using a water, or water-based, solution including antifreeze. By using a stronger solvent, greasy and rusty automotive and industrial parts and equipment can be cleaned. A detergent can be used for removing spills and grease deposits from kitchen surfaces such as those on stoves, ovens, frying pans and countertops. Ammonia solutions can be used to remove finger marks and dirt from windows and other glass surfaces. With polish solutions, the system can also be used as a duster/polisher for wooden furniture surfaces.

The present invention can also be readily sterilized prior to impregnation with a suitable sterile fluid. By so doing, the system can be used in hospital and emergency medical applications where it is necessary to clean away blood, dirt, grime and possibly radioactive or toxic contamination before treatment can begin.

In addition to these cleaning applications, inner towel 52 may be impregnated with fragrances, lotions and/or emollient creams used for skin cleaning, as well as toning/conditioning prior to the application of makeup or other cosmetics.

The towel packet can be made in sizes to be easily portable and carried in an automobile glove compartment, purse or in a large pocket in a coat and the like. It could also be packaged in dispensers for use in nurseries and public washrooms. Similarly, when impregnated with alcohol, iodine or some other disinfectant solution, single containers of the subject invention could be used as part of a first aid kit for disinfecting and cleaning small injuries at home or during camping trips or other outdoor activities. With other impregnants and suitable inner and outer towels, the system could also be used to refresh the user and to remove excessive perspiration following strenuous exercise; to clean or polish silver plate, leather shoes, sports equipment, eyeglasses, restaurant tables or telephone receivers, or the like. Finally, although described in terms of being square or rectangular, it is obvious that cleansing towel system 10 could be of any shape, such as triangular or round, to meet particular needs.

Depending on the use involved and the level and type of contaminant material picked up, the unit may be discarded according to EPA and/or local environmental rules or, if allowed, laundered, reimpregnated, refolded and sealed and, in time, reused.

It is to be understood that the above-described embodiments are merely illustrative of the many specific embodiments which represent applications and uses of the present invention. Clearly, numerous other arrangements can be readily devised by those of skill in the art without departing from the spirit and scope of the invention as defined in the appended claims and all changes which come within the scope and equivalency of these claims are intended to be embraced therein.

I claim:

1. A multilayer cleansing kit comprising, a first absorbent layer, a second absorbent layer impregnated with at least one cleaning solution, an impermeable liner intermediate said first and second absorbent layers to prevent said cleaning solution from passing from said second absorbent layer to said first absorbent layer, said first and second absorbent layers and said impermeable liner laminated together to form a unitary device, said first absorbent layer extends beyond said second absorbent layer and said liner which to form a flap can be folded relative to said kit.

2. The kit recited in claim 1 wherein, said device is folded approximately in half so that said first absorbent layer forms the outer surface of a packet and said second absorbent layer is completely enclosed within said impermeable liner.

3. The cleansing kit of claim 1 wherein, said cleaning solution consists of at least one component selected from the class consisting of water, ammonia solution, antifreeze, acetic acid solution, a petroleum based solvent, alcohol, disinfectant solution, fragrances, facial lotions and emollient creams.

4. The cleansing kit of claim 1 wherein, at least one of said first and second absorbent layers is made of terry cloth.

5. The cleansing kit of claim 1 wherein, both of said first and second absorbent layers are made of terry cloth.

6. The cleansing kit recited in claim 1 wherein, at least one of said first and second layers is made of absorbent paper.

7. The cleansing kit recited in claim 1 wherein, said second absorbent layer comprises a sponge.

8. The cleansing kit recited in claim 1 including, fastener means for selectively fastening said flap to said kit.

9. The kit recited in claim 1 wherein, said first absorbent layer includes a gripping surface thereon whereby said kit can be gripped by a user.

10. The kit recited in claim 9 wherein, said gripping surface includes a pocket formed on said first absorbent layer.

11. The kit recited in claim 1 wherein, said first and second absorbent layers and said impermeable liner are formed of reusable materials.

* * * * *